Figure 1:
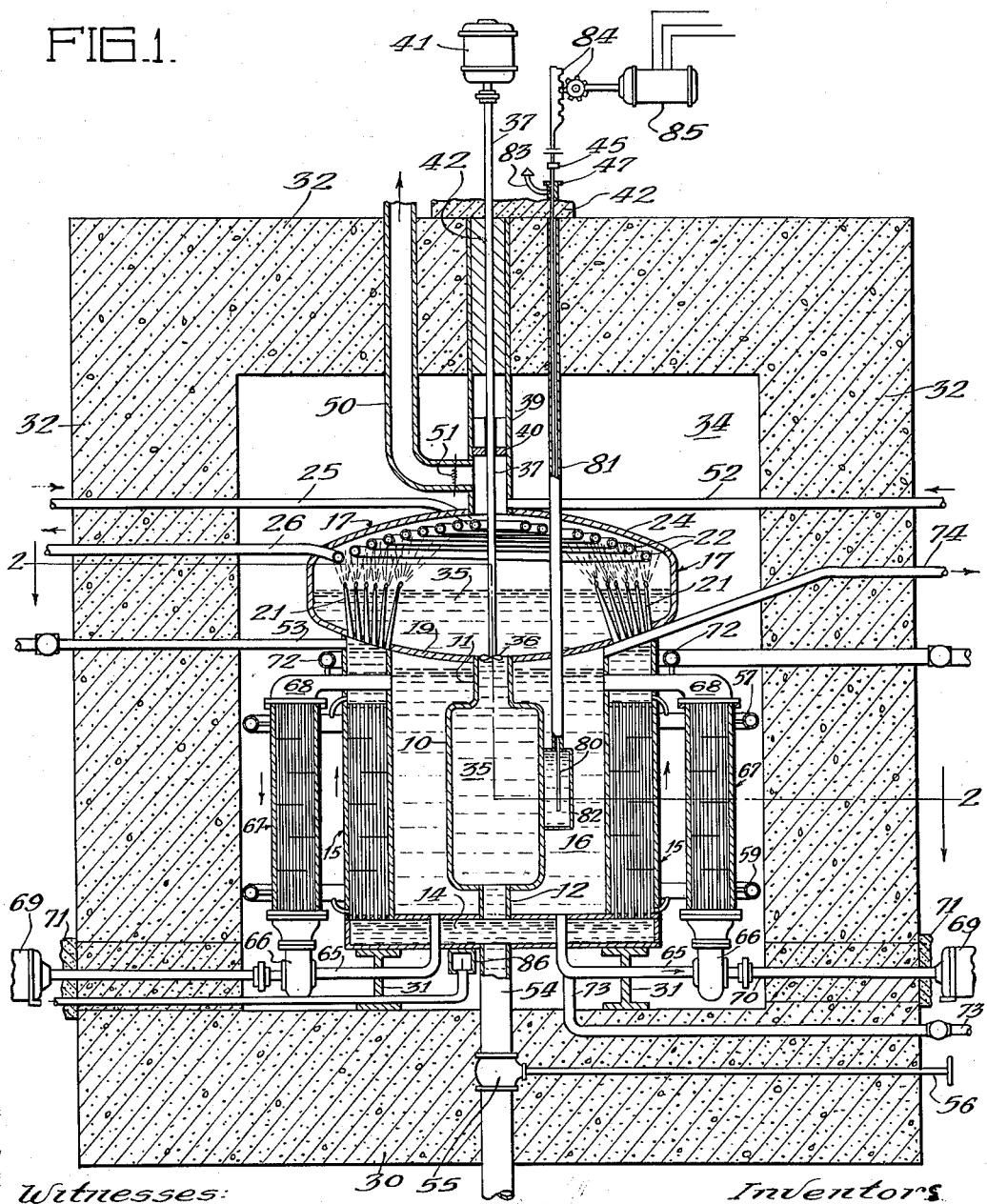

June 27, 1961 L. W. NORDHEIM ET AL 2,990,355
MEANS FOR CONTROLLING REACTIONS
Filed Nov. 2, 1945 2 Sheets-Sheet 2

Witnesses:
Herbert E. Metcalf
Estill E. Ezell

Inventor:
Lothar W. Nordheim
Eugene P. Wigner
By:
Robert A. ——
Attorney

United States Patent Office 2,990,355
Patented June 27, 1961

2,990,355
MEANS FOR CONTROLLING REACTIONS
Lothar W. Nordheim, Oak Ridge, Tenn., and Eugene P. Wigner, Chicago, Ill., assignors to the United States of America as represented by the United States Atomic Energy Commission
Filed Nov. 2, 1945, Ser. No. 626,379
2 Claims. (Cl. 204—193.2)

The present invention relates to the general subject of nuclear fission and more particularly to an improved method and means of controlling a neutronic reaction device known as an isotope converter.

It has been pointed out in co-pending application, of Wigner et al., Serial No. 628,322, filed November 13, 1945, now Patent No. 2,815,321, issued December 3, 1957, that in an isotope converter a self-sustaining chain reaction takes place in a relatively small mass of a reactive composition known as the active portion of a neutronic reactor containing a thermally fissionable isotope such as $U^{233}$, $U^{235}$, $94^{239}$ (a transuranic element known as plutonium), or mixtures thereof, used, for example, in solution or as a slurry in a liquid neutron moderator, such as $H_2O$ or $D_2O$ (heavy water). Such small masses have a high neutron leakage from the periphery thereof, and this leakage may be put to good use by absorbing the escaping neutrons in an absorber such as, for example, thorium, leading to the production of the thermally fissionable isotope $U^{233}$. In such converters the neutron absorbing thorium is usually combined with a neutron moderator so that escaping fast neutrons may be slowed down to energies where they are readily absorbed by the thorium nuclei. However, the combined neutron capture cross-section of such an absorbing layer or blanket is high as compared to the use of a layer of moderator alone surrounding a reactor. Such an outer layer incorporating a moderator alone, is generally termed a reflector, inasmuch as good moderators are, in general, good neutron scattering substances, and reflect or scatter a substantial quantity of neutrons back into the reactor and thus reduce neutron loss from the chain reaction.

The reactivity of reactive compositions is in many cases controlled by the insertion of a greater or lesser extent of a neutron absorbing regulating or control rod into the reactive composition, so that when fully inserted, the reaction will be stopped by the neutron absorption in the rod, but when partially withdrawn to what is commonly known as the critical position, the neutron reproduction ratio is unity. Withdrawal of the rod beyond the critical position will provide a neutron reproduction ratio over unity, and the neutron density in the reactor will then rise. When a desired neutron density has been attained, the return of the control rod to the critical position will then hold the reaction at the desired level.

Many reactors, particularly those having reactive compositions where the fissionable material is disposed in liquid moderator as a solution or slurry, are operated with the reactive compositions under pressure, to prevent boiling or formation of bubbles in the composition at elevated power outputs. It is, in many cases, not convenient to insert the control rod directly in the reactive composition while under pressure. In other cases, even when the reactive composition is not under pressure, it is not desirable to have the control rod inserted into the reaction zone. For example, in reactors wherein a reflecting layer surrounds the reaction zone and wherein this reflecting layer has little neutron absorption therein and particularly wherein the reaction zone is small with high neutron escape, the control rod may be placed outside the reaction zone within the reflector, and good control can be thus accomplished because the rod when inserted into the reflector gathers thermal neutrons that would normally be reflected back into the reaction zone. However, when a highly absorbent blanket or zone is provided to surround the reaction zone as, for example, when a $ThO_2$-water slurry is used for the production of $U^{233}$ by absorption of escaping neutrons in thorium, the use of a control rod in the absorbing blanket will greatly reduce the effect of the rod upon the reaction because of the normally high neutron absorption in the material surrounding the reaction zone, leading to the result that few thermal neutrons are reflected back into the reaction zone from the absorbing material there around.

It has been found, however, that good control of the neutronic reaction can be obtained in a neutronic reactor such as above described, when the rod is in a position at which said rod would otherwise be closely surrounded by neutron absorbing material, by spacing the rod from the absorbing material by a layer of highly efficient neutron moderator only, such as $D_2O$, for example. Such a rod, when made from materials absorbing thermal neutrons most strongly, such as cadmium, is exceptionally effective inasmuch as the rod will absorb thermal neutrons emanating from the reactive composition and reaching the rod and will also absorb neutrons slowed to thermal energies after leaving the reaction zone and entering the $D_2O$ surrounding the rod. In other words, a cadmium control rod is more efficient when surrounded by a layer of $D_2O$ of high neutronic purity than when it is inserted in a substantially homogeneous solution or a slurry having a high neutron capture cross-section.

It is, therefore, an object of the present invention to provide efficient control means for neutronic reactors normally requiring the insertion of a control rod in a highly neutron absorbent composition.

It is another object of the invention to improve the controlling efficiency of a slow neutron absorbing control rod.

It is still another object of the present invention to provide an improved means and method of controlling a neutronic reactor.

Figure 2:
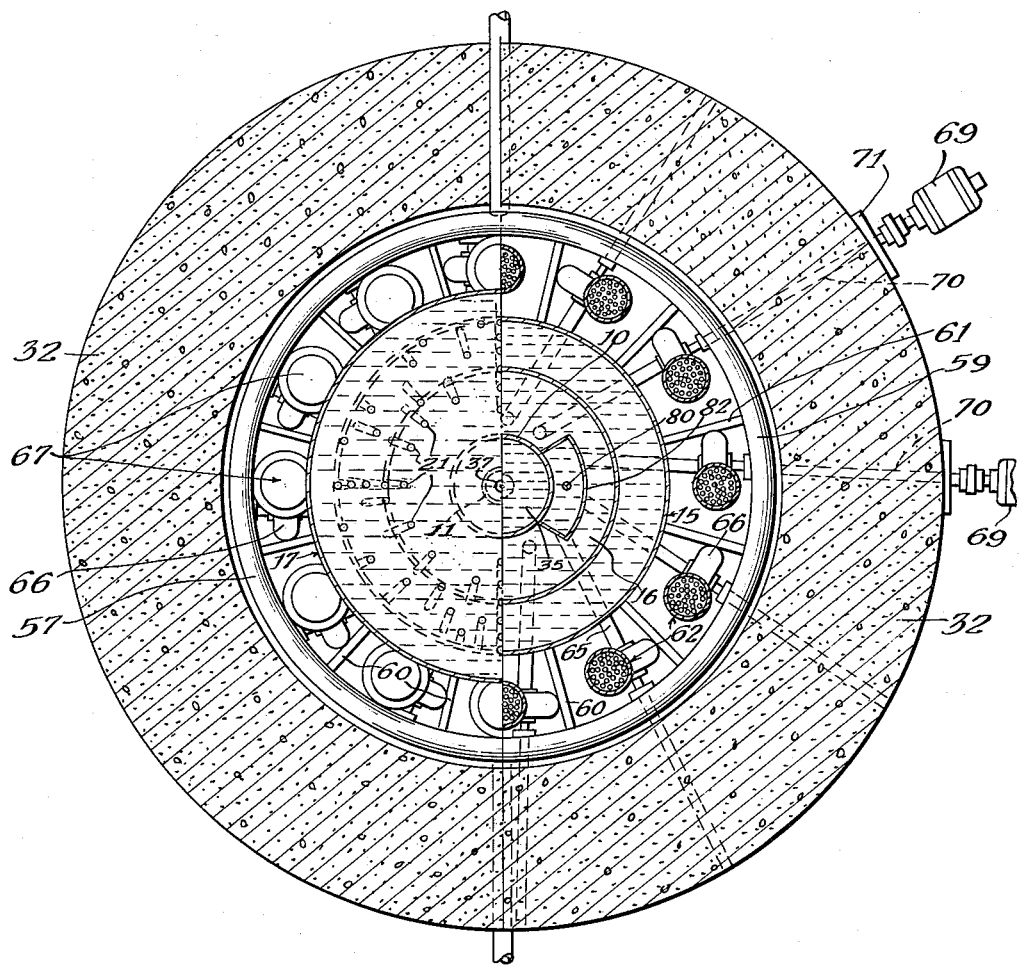

The foregoing and other advantages and objects of the present invention will be more fully understood by reference to the following specification and to the attached drawings, in which:

FIG. 1 is a diagrammatic vertical sectional view, partly in elevation, of a solution type reactor incorporating an absorbing blanket; and FIG. 2 is a cross sectional view taken as indicated by the line 2—2 in FIG. 1.

Referring to FIGS. 1 and 2, which illustrate a solution type reactor surrounded by an absorbing slurry and incorporating the present invention, a vertical elongated cylindrical reaction tank 10, approximately 100–120 centimeters in diameter and 260 centimeters high, is provided with an upper solution inlet pipe 11 and a lower outlet pipe 12. Outlet pipe 12 enters a stocky cylindrical solution distributor or outlet tank 14 extending outwardly beyond the extent of the reaction tank 10 to support and connect with the tubes of a heat exchanger 15 concentrically surrounding the reaction tank 10 to provide a slurry space 16 between the reaction tank 10 and the heat exchanger 15 that completely surrounds the reaction tank 10 except for inlet and outlet pipes 11 and 12, respectively.

Just above the reaction tank 10, the inlet pipe 11 enters a cooling solution inlet tank 17, the bottom 19 of which extends laterally to rest on the top edges of the solution heat exchanger 15. Cooling tank 17 receives solution from the top of the heat exchanger 15 through a plurality of upwardly directed nozzles 21, the solution from the nozzles 21 being projected against a cooling coil 22 positioned just below top 24 of cooling tank 17. Coolant is supplied by coil inlet 25 and coil outlet 26.

The combination of solution distributor tank 14, inner reaction tank 10, outer heat exchanger 15, and upper cooling tank 17 is supported on a foundation 30, such as concrete, by beams 31; and shield side and top walls 32 of neutron and gamma ray absorbing material are projected upwardly and across the top of the combination to define a reactor space 34. Thick concrete can be used for walls 32.

The reactive solution 35 used in tank 10, is circulated by an axial flow impellor 36 positioned in inlet pipe 11 near the bottom 19 of cooling tank 17. Impellor 36 is driven by a shaft 37 extending upwardly in an axial shaft pipe 39 opening into cooling tank 17. Gas passage along shaft pipe 39 is blocked a short distance above cooling tank 17 by packing 40. Shaft 37 continues upwardly through top shield wall 32 to an exteriorly disposed impellor motor 41. Radiation through shaft pipe 39 is blocked by lead plug 42.

A gas outlet 50 leaves axial shaft pipe 39 between the cooling tank 17 and packing 40 and extends upwardly through the top shield wall 32 for release of non-condensible gases. Dissociation gases such as $H_2$ and $O_2$ or $D_2$ and $O_2$ are recombined, as for example, by a burner indicated diagrammatically as a filament 51. The water so recombined runs back into cooling tank 17. Gas dilution to prevent explosions is supplied by dilution gas pipe 52 entering shaft pipe 39 between the cooling tank 17 and gas outlet 50.

Solution is normally supplied to or removed from the solution circulation zone through solution pipe 53 attached to the top of heat exchanger 15. Solution can be more quickly removed from the system by an axial dump pipe 54 entering the bottom of solution distributor tank 14 under the control of dump valve 55 operated by extended valve shaft 56. The use of dump valve 55 will be later explained.

Coolant is supplied to heat exchanger 15 from an inlet manifold 57 and is discharged into an outlet manifold 59, being connected thereto by solution coolant inlets 60 and solution coolant outlets 61 respectively (FIG. 2).

Thus, when solution is placed in the system, any heat of reaction developed in reaction tank 10 will be removed first by heat exchanger 15, and second by vaporization, condensation and cooling in cooling tank 17 due to the action of nozzles 21 and cooling coil 22.

The slurry to be placed in slurry space 16 is also circulated and cooled. A plurality of slurry outlet pipes 65 connect the bottom of slurry space 16 with a plurality of slurry pumps 66, discharging into slurry heat exchangers 67 which discharge into slurry space 16 at the top thereof through pipes 68. The exchangers 67 are positioned outside of and around exchanger 15. Pumps 66 are driven by pump motors 69 positioned outside of shield wall 32, each motor and pump being connected by a pump motor shaft 70 extending through shield wall 32 in a removable plug 71. Slurry can be taken out of the system by means of slurry removal manifold 72 connected to the tops of the heat exchangers 67, and introduced into the system by slurry inlet pipe 73 connected to one of the slurry outlet pipes 65. Gas evolved in slurry space 16 is vented through vent pipe 74. Coolant is supplied to the slurry heat exchangers 67 from the water manifold 57 and discharged by the manifold 59.

The reactor is controlled by a rod 80 of slow neutron absorbing material, such as cadmium, or thorium extending downwardly through the top shield wall 32 and the solution inlet tank 17 through a control rod pipe 81 and extending into a control rod chamber or pocket 82 abutting a small portion of the periphery of the reactor tank 10 on one side thereof and extending radially about half way across the slurry chamber 16. The control rod 80 is supported and driven into and out of chamber 82 by a rack and pinion mechanism 84 actuated by a reversible motor 85, under the control of an operator, who also monitors the neutron density in the system by means of ionization chamber 86 disposed adjacent the solution outlet of tank 10. $D_2O$ (heavy water) only is preferably used in chamber 82 and is inserted through filler pipe 83 connected to the pipe 81 and, if desired, the heavy water may be circulated by making the rod 80 hollow and forcing the heavy water upwardly therethrough. The end of the control rod 80 absorbs neutrons escaping from the reaction tank 10 in accordance with the amount of said rod inserted into chamber 82 as will be brought out later. Light water ($H_2O$) is also satisfactory for filling chamber 82, as are solid moderators such as Be, BeO and graphite, but heavy water is preferred.

In operation, the control rod 80 is inserted to maximum neutron absorbing position in the control rod chamber 82. A reactive composition of fissionable isotope and liquid moderator is inserted in the system through solution pipe 53 and the impellor 36 is rotated. Circulation of the reactive composition is then established through the reaction tank 10 and the heat exchanger 15. Water is circulated through the heat exchanger 15 as a coolant.

Slurry space 16 may be filled with a thorium-$D_2O$ slurry in equal parts by weight, for example, circulation started, and the device is ready for the start of the nuclear chain reaction. The control rod 80 is then slowly removed from the control rod chamber 82 until a point is reached where the neutron reproduction ratio in the reactor tank 10 is greater than unity. The fissionable isotope density in the liquid has been previously determined to be such that, for the size of the tank used, operating conditions are obtained, where the reproduction ratio is below unity and above unity for different positions of the control rod. The chain reaction can then be allowed to proceed until a predetermined operating power has been reached with the reproduction ratio above unity. At this power where the heat of the reaction is removed by the heat exchangers to stabilize the operating temperature, the control rod 80 is moved to the position where the reproduction ratio is unity, thereby stabilizing the reaction at the power attained. Slight movements of the control rod then serve to maintain operating power.

During operation, the fissionable isotope is used up in fission as it passes through the reaction tank. Fission products are released, these products being radioactive and neutron absorbing. Consequently, either at intervals or continuously some of the reaction composition is drawn off through solution pipe 53, purified, fortified to proper isotope density, and returned to the reactor. Likewise, the slurry carrying the absorber is periodically withdrawn for chemical extraction of the produced fissionable isotope and purification of the slurry. A slurry having a $ThO_2$ particle size of .01 to 1 micron is stable and has good viscosity for circulation.

In the specific example described, the reaction tank 10 has a volume of about 3 cubic meters and for conversion of $Th^{232}$ to $U^{233}$, employing $94^{239}$ as fissionable material, contains 1 gm. of plutonium per liter. The $94^{239}$ can be dissolved in the moderator in the form of a salt such as the nitrate, sulphate or fluoride, and is circulated through the reactor at a high rate. Under these circumstances, the reactor can operate at high power continuously.

The amount of fissionable isotope which should be present in reaction tank 10 in order to establish a self-sustaining neutron chain reaction depends to a substantial degree upon the concentration of the fissionable isotope in the moderator, upon the shape of the tank, and also upon the neutron absorption characteristic of the moderator used. In general, it can be said that the amount of $94^{239}$ present should be at least about 200 grams with optimum concentration and using $94^{239}$ in high concentrations. The exact amount required will also depend upon the fissionable isotope which is used for the reactive composition.

In the operation of the converter, neutrons, both fast and slow, escape from the reaction zone. Slow or thermal neutrons are mostly absorbed directly in the thorium in the absorbing zone and fast neutrons are slowed down by collisions with the moderator nuclei in the absorption zone, and are then mostly absorbed by the thorium. If the control rod 80 were to be placed directly in the thorium slurry, the effectiveness of the rod material to absorb slow neutrons would be very little greater than the effectiveness of the thorium immediately surrounding the rod to absorb slow neutrons, and control the reaction by the rod would be small. Thus, insertion of a greater or less extent of the rod in the $ThO_2$ slurry would affect return of neutrons to the reaction zone only by a very small amount.

However, when the control rod 80 is inserted in a small pocket of moderator only, this pocket being positioned closely adjacent the reaction tank wall and extending into the slurry absorbing zone, a totally different condition exists. That part of the reaction zone having $D_2O$ only, on the outside thereof, because of the small neutron absorption in the $D_2O$, will return, under normal conditions, a substantial number of neutrons to the reaction zone and thus raise its reactivity. Consequently, the insertion of more or less of the control rod material in the moderator pocket will control the number of neutrons returned to the reaction zone, in accordance with the amount of thermal neutron absorption in the rod material. Furthermore, by spacing the rod a short distance away from the reaction tank wall, and from the surrounding slurry midway between, for example, some fast neutrons leaving both the reaction tank and the slurry will become slowed to thermal energies in the moderator and will be absorbed by the rod material. Thus, the rod is much more effective as a control if surrounded by a moderator of low capture cross section.

Neutrons not captured by the rod 80 in the moderator pocket 82 are not lost because they are either returned to the reactor by scattering or pass through the moderator in the pocket, being slowed down meantime to be absorbed in the thorium slurry surrounding the pocket. Thus, adequate control is obtained without loss in efficiency of the convertor.

Even when the control rod 80 can be readily inserted directly into the reaction zone, the efficiency of the control rod can be increased by surrounding the rod with moderator only, when the reactive composition is a slurry or a solution, because such reactive compositions are themselves highly absorptive of neutrons, either for fission or by capture, and the moderator slows down many neutrons to the low absorption energies which would otherwise not be in condition for absorption by a slow or thermal neutron absorber such as cadmium.

It is, therefore, clear that the present invention is equally applicable for use inside or outside of the reaction zone, when the position is such that the rod would normally be closely surrounded by a composition having a high thermal neutron cross-section.

While the theory of the nuclear chain fission mechanism in uranium set forth herein is based on the best presently known experimental evidence, we do not wish to be bound thereby as additional experimental data later discovered may modify the theory disclosed.

What is claimed is:

1. In a neutronic reactor comprising a tank, a material fissionable by neutrons of thermal energy dispersed in a liquid moderator in said tank, said dispersion having a neutron reproduction ratio in excess of unity, a container disposed about said tank, and a material convertible to a thermally-fissionable material by neutron absorption dispersed in a liquid moderator in said container and substantially surrounding said tank, the improvement comprising a control rod chamber disposed within the container outside of and adjacent to the tank, said chamber containing only a liquid moderator, a control rod formed of a material of high thermal neutron capture cross section, and means to insert and withdraw said control rod from said control rod chamber.

2. In a neutronic reactor comprising a tank, a solution of plutonium-239 in heavy water in said tank, said solution having a neutron reproduction ratio in excess of unity, a container disposed about said tank, and a slurry of thorium dioxide in heavy water in said container and substantially surrounding said tank, the improvement comprising a control rod chamber disposed within the container outside of and adjacent to the tank, said chamber containing only heavy water, a control rod formed of cadmium, and means to insert and withdraw said control rod from said control rod chamber.

References Cited in the file of this patent

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Kelly et al.: Phy. Rev. 73, 1135–9 (1948).

Smyth: "Atomic Energy for Military Purposes," pages 22, 177, August 1945.

Goodman: "The Science and Engineering of Nuclear Power," volume 1, pages 408, 424, 425, 412, 413, 410, 411, Addison-Wesley Press, Inc., Cambridge, Mass., 1947.